United States Patent [19]

Holtz

[11] 4,185,848

[45] Jan. 29, 1980

[54] SHOPPING CART

[76] Inventor: Gilbert J. Holtz, 182 Tibbetts Rd., Yonkers, N.Y. 10705

[21] Appl. No.: 932,279

[22] Filed: Aug. 9, 1978

[51] Int. Cl.² .............................................. B62B 1/04
[52] U.S. Cl. .................................. 280/652; 280/655; 280/47.37 R; 301/124 R
[58] Field of Search ........ 280/652, 654, 655, 47.37 R, 280/37, DIG. 6; 301/124 R, 125, 131

[56] References Cited

U.S. PATENT DOCUMENTS

| | | | |
|---|---|---|---|
| 2,564,939 | 8/1951 | Weast | 280/652 |
| 2,738,984 | 3/1956 | Korchan | 280/652 |
| 3,166,339 | 1/1965 | Earley | 280/654 |
| 4,017,091 | 4/1977 | Wallen | 280/DIG. 6 |
| 4,062,565 | 12/1977 | Holtz | 280/655 |

*Primary Examiner*—Robert R. Song
*Attorney, Agent, or Firm*—Bauer & Amer

[57] ABSTRACT

A shopping cart of the type having a collapsible, or foldable, basket which can readily assume a nominal volume or size and wherein, also, the pushing handle is also collapsible to a greatly diminished size and the wheels, heretofore structural features that required significant storage space, are readily reoriented into the flat plane of the basket and handle, to thereby contribute to the compactness of the cart when it is prepared for storage or periods of non-use.

4 Claims, 6 Drawing Figures

SHOPPING CART

The present invention relates generally to shopping carts, and more particularly to an improved construction for such cart that is sufficiently sturdy for load-carrying and other normal abuse during its utilization and yet is collapsible into an optimum, minimum size during storage or periods of non-use.

Wire basket shopping carts, as exemplified by those of prior U.S. Pat. Nos. 2,589,044 and 2,711,327, to refer to just a few, are used undoubtedly because of their convenience in providing a compartment for storing packages and the like during shopping, and subsequently being readily foldable into a greatly diminished size, so as to be readily stored in a vehicle trunk or other cramped storage area. Consistent with the folding of the basket to achieve an optimum storage size in the cart, it is also necessary to reduce the handle size, and also to obviate, to the extent possible, the storage space requirements for the wheels. Heretofore, reduction of the handle size has been at the expense of its sturdiness during use, and has not been entirely satisfactory. For example, a prior art handle is typically comprised of telescoped halves which, although readily providing both a compact and extended size, is not particularly sturdy or rigid in said extended size.

Similarly, the typical prior art solution applied to the wheels is one which contemplates their temporary removal, which while obviating the storage problem may inconvenience the user if there is loss or any damage to any such disassembled wheel.

Broadly, it is an object of the present invention to provide an improved shopping cart overcoming the foregoing and other shortcomings of the prior art. Specifically, it is an object to provide a wire basket-type shopping cart in the non-use condition of which the basket, handle and wheels are all in the same flat plane, to thereby require a nominal storage space area for the cart.

A shopping cart demonstrating objects and advantages of the present invention is of the type having a folding basket and a two-part inverted U-shaped pushing handle, said handle consisting of a handle upper and lower parts. In a preferred embodiment, the folding basket is attached and thus supported on the handle lower part. The handle upper part which presents a hand grip, is pivotally connected adjacent the upper end of said handle lower part so as to be pivotally movable between operative and storage positions in relation thereto. Further, at opposite facing locations on the handle lower part, there is provided a cooperating pair of wheel-supporting axles, one said axle of each pair being oriented transversely of the pushing direction of the cart for rotatably supporting wheels of said cart during said pushing movement thereof, while the other axle of each pair is advantageously oriented in an appropriate direction for receiving the wheels in mounted storage positions thereon in a corresponding perpendicular orientation to said cart normal movements. As a result, said wheels in said storage position are held in the same flat condition as said handle and as said folded basket thereon, to thereby contribute to a compact storage condition in said cart.

The above brief description, as well as further objects, features and advantages of the present invention, will be more fully appreciated by reference to the following detailed description of presently preferred, but nonetheless illustrative embodiments in accordance with the present invention, when taken in conjunction with the accompanying drawings, wherein.

Figure 1:
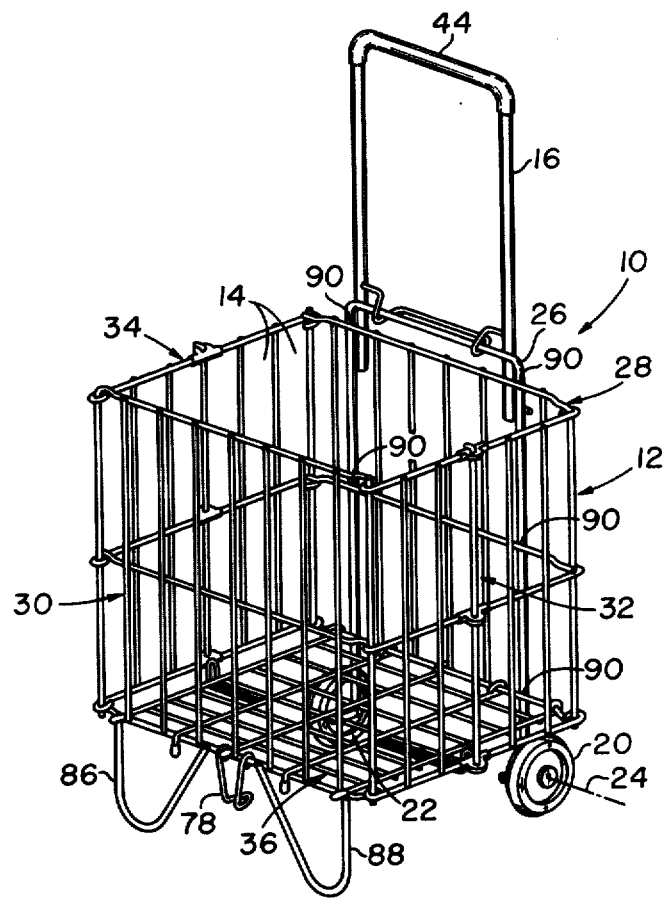
FIG. 1 is a perspective view of an improved shopping cart according to the present invention.
Figure 3:
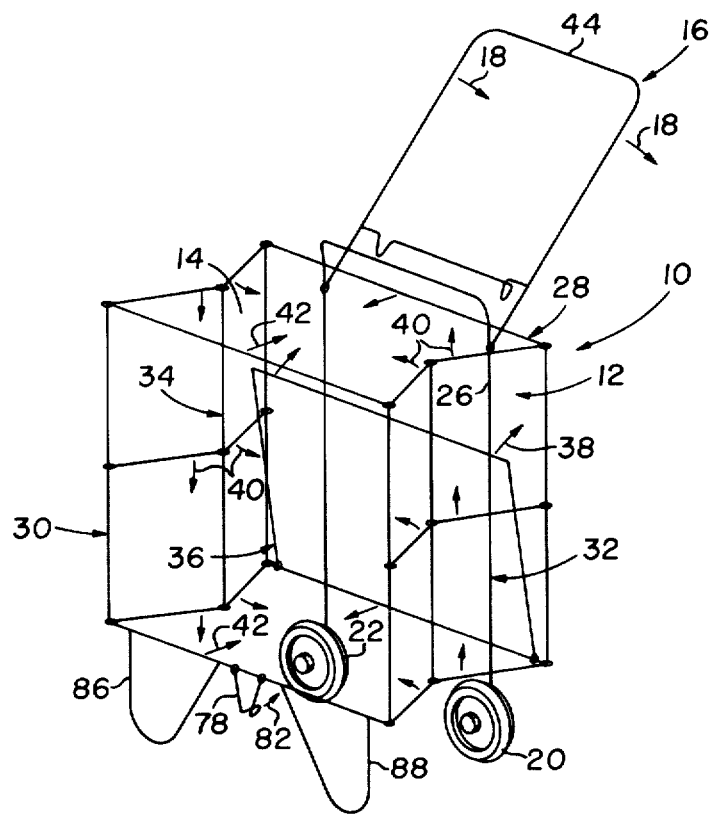
FIG. 3 is simplified perspective view of the shopping cart illustrating the manner in which the various parts thereof fold from an operative three-dimensional condition into a compact storage condition.

Reference is now made to the drawings and, in particular, to FIGS. 1 and 3 which illustrate the improved shopping cart hereof, generally designated 10. In its general aspects cart 10 is one of a great number of models which include a wire-type basket 12 that in an unfolded condition bounds a compartment 14 for food packages, laundry, etc. When not in use, and as is best shown in FIG. 3, cart 10 is constructed so that the basket 12 thereof is capable of being folded so that it occupies a greatly diminished volume, thereby providing the cart with a convenient, compact storage condition. In addition to the basket 12 folding, as diagramatically illustrated in FIG. 3, it is also desirable that the pushing handle of the cart 10, or at least the upper handle part 16 thereof, be pivotally movable, again as illustrated in FIG. 3, through a pivotal traverse 18 against the folded basket 12 so that in overall size the storage condition of the cart 10 is essentially that of the folded basket 12.

Although, as already noted, shopping carts, as exemplified by cart 10, are already well known in so far as providing an erect unfolded structure suitable for storing and carrying objects, such as food packages during a shopping excursion, and, during periods of non-use, being foldable into a compact storage condition so as to be conveniently stored in a vehicle trunk or other cramped storage space, the within cart 10 has noteworthy improvements over such known carts. In the description which follows reference will primarily be had to such improvements. More particularly, whereas heretofore there has been no particular problem in providing a collapsed and folded basket 12 of the referred to cart with a compact storage condition, by properly hinging various parts for folding movement, all as will be described in detail subsequently, there has heretofore been a problem providing the cart with the handle that is both sufficiently sturdy for pushing the cart during use and also readily able to undergo a reduction in size that contributes to an optimum compact storage condition in the cart. Also, the cart wheels 20 and 22 heretofore have presented a problem in efforts to provide the cart 10 with an optimum compact condition. As may readily be appreciated from FIG. 1, and taking wheel 20 as illustrative, it is of course necessary that in order to push the cart in a forward direction that the rotation axis for the wheel 20 must be transverse thereto. This, of course, orients the wheel 20 in a plane that necessarily must be perpendicular to the plane of the handle 16 and thus also perpendicular to the plane into which the basket 12 is folded when cart 10 is provided with its compact storage condition. Stated another way, the rotation axis of the wheel 20, illustrated by the reference line 24 in FIG. 1, is in the plane of handle 16 and therefore wheel 20, in the operative position thereof shown in FIG. 1, therefore must necssarily have a lateral extent, which corresponds to the radius thereof, on either side of said rotational axis 24. Thus, assuming that the basket 12 and the upper portion of the handle 16 is folded into the plane of the rotational axis 24, the wheels 20, 22 by virtue of extending laterally on opposite sides of this plane as just noted, represent structure in the folded, storage condition of the cart which imposes space requirements on the storage space for the cart. Of course, by minimizing the space requirements for the wheels 20 and 22, all in a manner as will be discussed subsequently, the space requirements for the folded cart 10 are also correspondingly reduced to an optimum minimum extent.

Before proceeding with a detailed description of a preferred embodiment of the within cart 10, it is helpful to note certain general aspects thereof. For example, cart 10 is of the type having a two-part inverted U-shaped pushing handle, the handle upper part being already noted by reference numeral 16 and the lower part being denoted by reference numeral 26. Basket 12 is defined by a cooperating arrangement of similarly constructed wire grids serving respectively as a back wall 28, a front wall 30, opposite side walls 32 and 34, and finally as a bottom panel 36. As may be readily appreciated from a comparison of FIGS. 1 and 3, cart 10 is readily converted from its open or unfolded condition as illustrated in FIG. 1 into a compact condition in which it occupies an optimum minimum volume by the folding of the basket 12 in the following sequence: First, bottom panel 36 is raised through a pivotal traverse 38 against back wall 28; next, the side walls 32 and 34, by virtue of being constructed in two sections and hinged at a central location are foldable inwardly as in the directions 40 such that each of the side walls 32 and 34 also assume a position flush against, and thus in the plane of, the back wall 28. Naturally, the inward folding movement 40 in the side walls 32 and 34 automatically move the front wall 30 in a rearward direction 42 also against, and thus into the plane of, the back wall 28. In the foregoing manner, the basket 12 is thus made to readily assume its folded condition, as illustrated in FIG. 3 and, by reversing the procedure, its unfolded operative condition as illustrated in FIG. 1.

The inverted U-shaped handle lower part 26 and upper part 16, when in extended relation to each other, as illustrated in FIG. 1, constitute the largest-sized structural feature of cart 10. During use, as when cart 10 is typically pushed using hand grip 44 of handle upper part 16, the size or height at which handle upper part 16 extends above the basket 12 contributes to the ease in which basket 12 is readily manipulated through rolling movement on the wheels 20, 22 in forward and rearward directions, as well as through a turning radius, and thus should be of a significant extent. However, in the compact storage condition of the cart, it is necessary that the handle upper part 16 be folded against handle lower part 26 and thus occupy a position in the plane of said handle lower part 26 and thus also in the plane of the folded basket 12.

To provide the handle upper and lower parts 16 and 26, respectively, with operative and storage conditions relative to each other, these parts are pivotally interconnected so that the handle upper part 16 can partake of a pivotal traverse 18 in relation to the handle lower part 26, all as has already been noted. Moreover, it is contemplated that in the operative condition of these handle parts, in which they are in extended relation to each other, that there are two preferred constructions for holding the handle upper part 16 in said extended relation to the handle lower part 26, the same being more particularly illustrated in FIGS. 2A and 2B to which reference is now made.

Figure 2A:
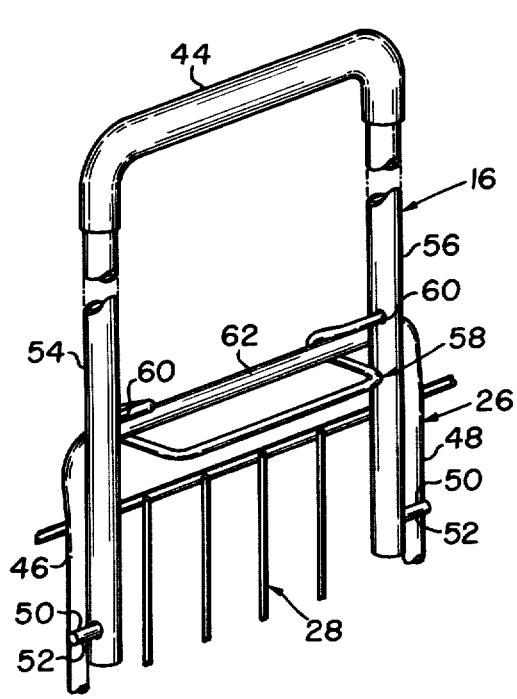
FIG. 2A is a partial perspective view, on an enlarged scale, of one embodiment of a handle for pushing the cart during use.

Reference is made to a first preferred embodiment of pivotally interconnected handle upper and lower parts 16, 26 as illustrated in FIG. 2A. As shown therein, the inverted U-shaped handle lower part 26 which, more particularly, includes substantially parallel straight or leg portions 46, 48 has appropriately connected to it, as by welding at the locations 50, a pair of cylindrical pins 52 which are projected into the hollow pipe-like leg portions 54, 56 of the handle upper part 16 and consequently is movable through pivotal traverses about the rotational axis of pins 52. During use of the cart 10 it is of course required that the handle upper part 16 occupy an extending position relative to the handle lower part 26 so that it serves as an extension of the handle lower part 26 and thereby provides a handle of an overall size which is convenient for pushing or pulling the cart 10. To maintain the handle parts 26, 16 in their operative position in which part 16 is an extension of part 26, use is made of a holding clip 58, fabricated of a springy metal material, which is pivotally mounted, as at 60, to the handle upper part 16. Clip 58 is adapted to be urged into engaged relation with the connecting leg 62 of the handle lower part 16 as a result of a pivotal traverse which projects the clip 58 beneath, and into frictional engagement with said leg 62. To release handle upper part 16, preparatory to pivotal movement 18 thereof which is necessary in providing the compact storage condition of the handle, all that is necessary is to unsnap clip 58 from beneath the leg 62 by urging the clip through counterclockwise rotation about the pivot 60.

Figure 2B:
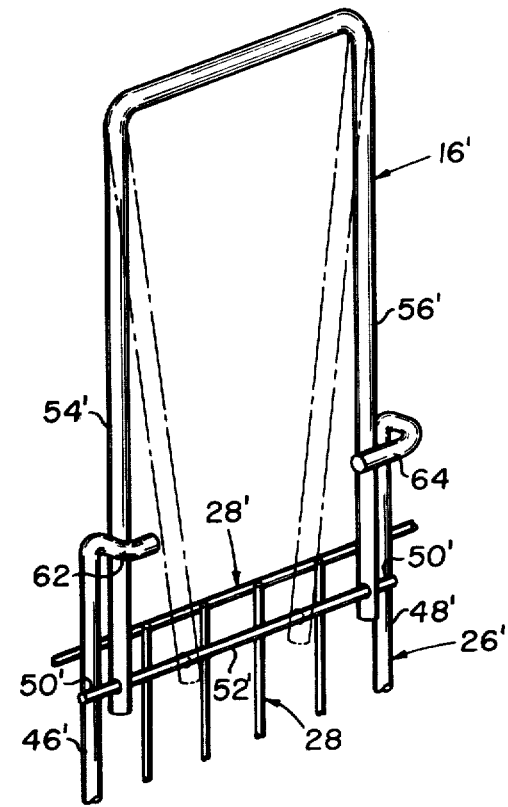
FIG. 2B, like FIG. 2A, is a perspective view, but of another embodiment of a handle for the cart wherein, further, positions of movement of the upper portion of the handle are illustrated in full line and in phantom line perspective.

An alternative preferred construction for the pivotally interconnected handle upper and lower parts 16, 26 is illustrated in FIG. 2B, to which drawing figure reference is now made. In this drawing, parts similar to those already described will be referred to by the same, but primed reference numerals. As illustrated, handle lower part 26', and more particularly the legs 46', 48' thereof, have attached thereto, by welding as at the locations 50' a cylindrical shaft 52' on which the depending legs 54', 56' of handle upper part 16' are mounted both for sliding and pivotal movement. In this regard, handle upper part 16' will be understood to be made of a springy material so that the legs 54', 56' can be squeezed together, as indicated by the positions of movement thereof illustrated in phantom perspective in FIG. 2B, and when released will again assume the inverted U-shape illustrated in full line in FIG. 2B. To hold handle upper part 16' in extended relation to the handle lower part 26', use is made of a hook-like bend 62 and 64 formed in the upper portion of the legs 46' and 48', respectively. In the operative position of handle upper part 16', as when it serves as and extension of the handle lower part 26', the legs 54' and 56' are fully expanded and consequently are seated in the hooks 62 and 64. As a result handle upper part 16' is confined against pivotal movement by hooks 62 and 64 in one direction, and by the back wall 28' in the opposite direction. However, to release handle upper part 16' for its pivotal movement 18 (as noted previously in connection with FIG. 3), it is necessary only to exert pressure on the legs 54', 56' which result in sliding movement in the lower portions of these legs along the shaft 52' providing the positions thereof illustrated in phantom perspective in FIG. 2B. In these positions, it is of course then possible to rotate the handle upper part 16' through the clearance between the hooks 62 and 64 into its compact storage condition against the handle lower part 26'.

Figure 4:
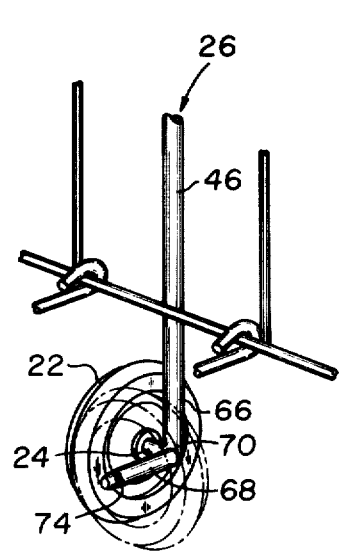
FIG. 4 is an isolated perspective view illustrating the two positions for the wheels of the cart, said two positions being illustrated in full line and phantom line perspective.

As a final procedure to providing the cart 10 with its compact storage condition, the within invention contemplates reorienting wheels 20, 22 from their positions as illustrated in FIG. 1 which are essentially perpendicular to the flat plane of the collapsed or folded cart to the more favorable positions in which said wheels are in the same plane thereof, the latter positions being illustrated in FIG. 3. To achieve the aforesaid, on the depending extension of each of the legs 46 and 48 of the handle lower part 26 there is a cooperating pair of wheel-supporting axles which are oriented perpendicularly of each other and which therefore are capable of supporting wheels in either of two positions which are correspondingly perpendicular to each other. FIG. 4 illustrates this in connection with the handle lower part leg 46, it being understood, of course, that the other leg 48 is similarly constructed. More particularly, on the extending length portion of leg 46, more particularly designated 66 in FIG. 4, there is provided in addition to previously noted axle 24 on which cooperating wheel 22 is rotatably mounted so that the cart 10 can be urged through its normal pushing and pulling directions of movement, there also is provided another wheel-supporting axle 68, the latter being appropriately formed integral on the extension 66 by being welded, brazed or otherwise connected thereto, as at 70. To change from the operative condition of wheel 22, as illustrated in full line at FIG. 4, to its storage condition as illustrated in phantom perspective, it is necessary merely to remove wheel 22 from axle 24 and place it on axle 68. As a result, wheel 22 is placed in the same plane as the collapsed basket 12 and the collapsed or folded together handle parts 16, 26, thus contributing to providing the cart 10 with an optimum flat condition which is convenient for storage of the cart.

Figure 5:
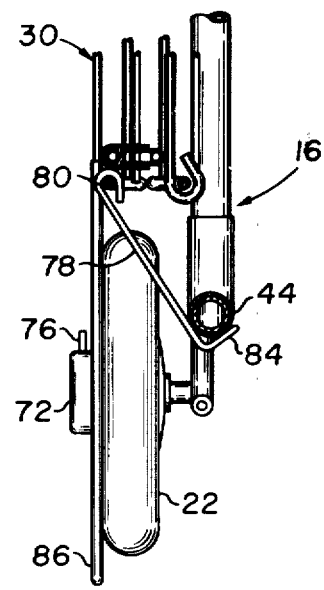
FIG. 5 is a side elevational view of the lower portion of the shopping cart, the same being also taken in longitudinal cross-section to further illustrate structural details thereof.

FIG. 5 illustrates an approved manner in which wheel 22, and thus also wheel 20, can be constructed to facilitate its ready removal from and placement on one or the other of the axles 24, 68. In addition to the usual central bearing of the wheel, there is also a retainer cap 72 of the type which has an internal member which is spring biased so that it assumes a seated position in a cooperating groove 74 (see FIG. 4) on the axle on which the wheel is then supported. As a result, cap 72 holds the wheel in its position of rotation on the supporting axle without interfering with rotative movement thereof. However, to remove the wheel, it is required only to depress an external projection 76 which will be understood to unseat the internal component from the groove 74 and thereby allow for sliding removal of the wheel from its axle support.

In accordance with the present invention, the compact storage condition of the cart 10 is maintained in a noteworthy manner by a simple pivotally traversable clip 78 mounted in depending relation from the front wall 30. More particularly, as may be best appreciated from FIGS. 3 and 5, said clip 78 is hooked at one end about the lower rod 80 of front wall 30 and thus is readily moved through a pivotal traverse 82 so that the opposite free end 84 thereof which is formed into a hook-like bend is able to snap into frictional engagement with the hand grip 44 of the handle upper part 16 when it is occupying its folded position against the handle lower part 26. Naturally, to release the components of the cart so that it can be erected into its unfolded operative condition, it is necessary merely to unhook clip 78 from hand grip 44 and reverse the procedures or steps previously described in connection with FIG. 3.

The standing position of cart 10 as illustrated, for example, in FIGS. 1 and 3, naturally require, in addition to the wheels 20, 22, support under the front end of the basket 12. The support is provided by wire legs 86 and 88 which are formed as structural features depending from the wire grid serving as the front wall 30 of the basket.

For completeness' sake, it is mentioned that basket 12 is appropriately supported on the handle lower part 26 as by being welded, brazed or otherwise connected thereto, as at the intersections therewith at locations individually and collectively designated 90.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A shopping cart comprising, in combination, a folding basket and a two-part inverted U-shaped pushing handle for said cart consisting of a handle upper and lower parts, said folding basket being in attached supported relation on said handle lower part and being comprised of a cooperating arrangement of a back wall, a front wall, a pair of opposite side walls, and a bottom panel, said back wall being supported on said handle lower part and there being pivotal connection means therefrom to said side walls and bottom panel so as to operatively mount same to partake of pivotal movement in flush relation against said back wall preparatory to providing a compact storage condition in said cart, said handle upper part presenting a hand grip and being pivotally connected adjacent the upper end of said handle lower part so as to be pivotally movable between operative and storage positions in relating thereto, and at opposite facing locations on the lower end portion of said handle lower part a cooperating pair of wheel supporting axles, one said axle of each pair being oriented transversely of the pushing direction of said cart for rotatably supporting wheels of said cart during said pushing movement thereof, said other axle of each pair being oriented in said cart pushing direction for receiving said wheels in mounted storage positions thereon in a corresponding perpendicular orientation, whereby said wheels in said storage position are held in the same flat condition as said handle and as said folded basket thereon to thereby contribute to a compact storage condition in said cart.

2. A shopping cart as claimed in claim 1 wherein each said cooperating pair of wheel-supporting axles is located on an end of said handle lower part extending in depending relation beyond said folding basket thereof, and said one axle thereof receives said cooperating wheel in said mounted storage position in an appropriate orientation that is in the plane of said basket in said folded storage condition thereof.

3. A shopping cart as claimed in claim 2 wherein said pivotal connection of said handle upper part to said handle lower part includes pivot means interconnecting said handle parts together, and a holding clip on said handle upper part operatively arranged to engage said handle lower part so as to hold said handle parts in extended relation to each other, to thereby provide a handle of appropriately convenient size during use of said cart.

4. A shopping cart as claimed in claim 2 wherein said pivotal connection of said handle upper part to said handle lower part includes a shaft member supported transversely of the upper end of said handle lower part, a pair of handle-engaging projections on said upper end of said handle lower part, and said handle upper part is pivotally and slidably mounted on said shaft member, whereby said handle upper part is selectively slidable into and out of engaged relation with said handle-engaging projections to correspondingly provide said operative and storage positions of said handle upper part in relation to said handle lower part.

* * * * *